(12) United States Patent
Chegini et al.

(10) Patent No.: US 7,975,222 B1
(45) Date of Patent: Jul. 5, 2011

(54) SYSTEM AND METHOD FOR DYNAMIC LINKING BETWEEN GRAPHIC DOCUMENTS AND COMMENT DATA BASES

(75) Inventors: Michael Chegini, Irvine, CA (US); Steven Hooper, Irvine, CA (US); S. Jay Hedjazi, Laguna Hills, CA (US)

(73) Assignee: E-Plan, Inc., Irvine, CA (US)

( * ) Notice: Subject to any disclaimer, the term of this patent is extended or adjusted under 35 U.S.C. 154(b) by 910 days.

(21) Appl. No.: 11/900,479

(22) Filed: Sep. 11, 2007

(51) Int. Cl.
*G06F 17/00* (2006.01)
(52) U.S. Cl. ........ 715/249; 715/205; 715/234; 715/733; 715/751; 707/999.003; 707/E17.119; 707/608; 345/619; 345/641
(58) Field of Classification Search .......... 715/200–211, 715/226, 227, 231, 232, 233, 234, 243, 244, 715/246, 247, 251, 255, 256, 273, 700, 760, 715/762, 763, 764, 719, 731, 733, 750, 751, 715/765, 864, 968, 973, 978; 707/600, 602, 707/607, 608, 609, 705, 805, 912, 913, 917, 707/964, 966, 999.001, 999.003, E17.005, 707/E17.029, E17.061, E17.069, E17.071, 707/E17.073, E17.14; 345/418, 619, 621, 345/622, 636, 641, 650, 676
See application file for complete search history.

(56) References Cited

U.S. PATENT DOCUMENTS

| | | | | |
|---|---|---|---|---|
| 5,444,843 A | * | 8/1995 | Nilsson et al. | 715/205 |
| 5,524,202 A | | 6/1996 | Yokohama | |
| 5,918,219 A | * | 6/1999 | Isherwood | 705/37 |
| 5,950,206 A | * | 9/1999 | Krause | 1/1 |
| 6,922,701 B1 | | 7/2005 | Ananian | |
| 7,042,468 B2 | | 5/2006 | Schwegler | |
| 7,062,514 B2 | | 6/2006 | Harris | |
| 7,174,339 B1 | | 2/2007 | Wucherer | |
| 7,283,975 B2 | * | 10/2007 | Broughton | 705/28 |
| 2002/0013933 A1 | * | 1/2002 | Shiba | 716/4 |
| 2002/0035451 A1 | * | 3/2002 | Rothermel | 703/1 |
| 2002/0198755 A1 | | 12/2002 | Birkner | |
| 2003/0052877 A1 | | 3/2003 | Schwegler | |
| 2006/0085322 A1 | * | 4/2006 | Crookshanks | 705/37 |
| 2006/0107203 A1 | * | 5/2006 | Schilling et al. | 715/517 |
| 2007/0061774 A1 | | 3/2007 | Chan | |
| 2007/0112860 A1 | | 5/2007 | Ostanik | |

OTHER PUBLICATIONS

Results of www.GOOGLE.COM/PATENTS by Applicant Mar. 16, 2007.

* cited by examiner

*Primary Examiner* — Maikhanh Nguyen
(74) *Attorney, Agent, or Firm* — Knobbe, Martens, Olson & Bear LLP

(57) ABSTRACT

A method for dynamic linking between graphic documents and comment databases is described and includes entering a base graphic representation of a project in a computer system. The base graphic representation may be the conversion of a user supplied format graphic to a web support format graphic. A coordinate overlay grid of a coordinate overlay program may be linked to the base graphic representation for overlay positioning and display on the base graphic representation. The coordinate overlay program may have a notation subprogram linked to the coordinate overlay grid for a user to designate notation with an identifier relative to a distinct location of the base graphic representation on the coordinate overlay grid. A text or graphic comment data record may be entered in a comment data record referenced to an identifier and displayed using a computer cursor device and display to activate an identifier.

30 Claims, 1 Drawing Sheet

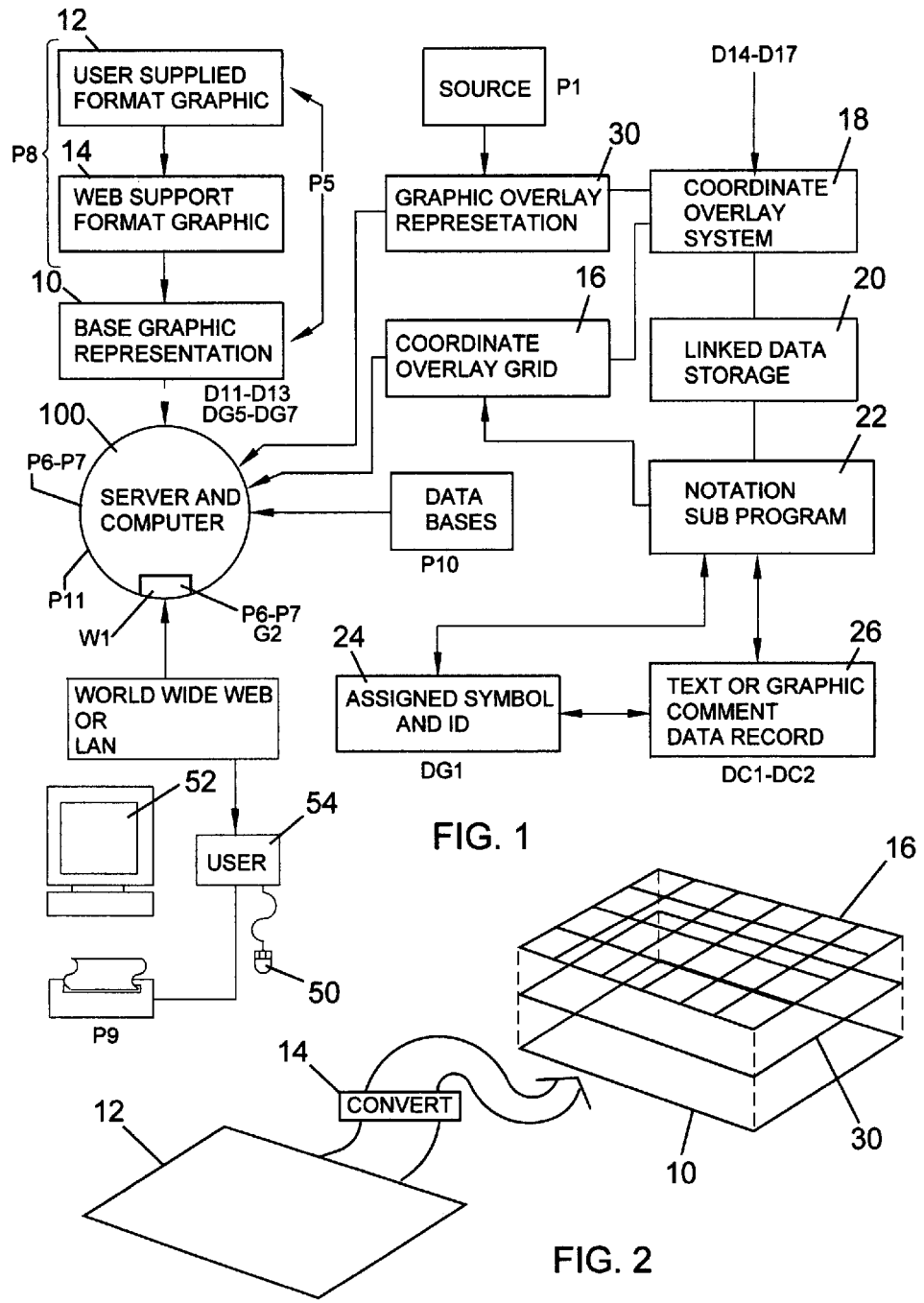

SYSTEM AND METHOD FOR DYNAMIC LINKING BETWEEN GRAPHIC DOCUMENTS AND COMMENT DATA BASES

BACKGROUND OF THE INVENTION

This invention relates to methods for use in managing construction projects for building structures, civil and public works projects, constructing manufacturing facilities, and for building products, such as, ships, land and air vehicles, and the like. The method may use a project plan review system implemented on a computer system with a program that may allow linking or integration of text and graphic documents such as drawings. The new method may allow efficient reviewer, designer and owner collaboration through a world wide web system based interactive system that may only require use of a standard web browser by a user.

Current industry practice for review and comment documentation may be to use EXCEL spreadsheets and manual markup and scans of graphic documentation or electronic mark up programs that may require installation of proprietary program software on a user's system. These systems may require inefficient, manual correlation of review documentation records and the subject graphic documents.

SUMMARY OF THE INVENTION

The present invention is directed toward methods for dynamic linking between graphic documents and comment data bases. A base graphic representation of a project may be entered in a computer system. The base graphic representation may be the conversion of a user supplied format graphic to a web support format graphic. A coordinate overlay grid of a coordinate overlay program may be linked to the base graphic representation for overlay positioning and display on the base graphic representation when displayed on a computer display viewport. The coordinate overlay program may have a text or graphic notation subprogram linked to the coordinate overlay grid for a user to designate notation with an identifier relative to a distinct location of the base graphic representation on the coordinate overlay grid. A text or graphic comment data record may be entered in a comment data record referenced to an identifier. The text or graphic comment data record may be accessed and displayed using a computer cursor device and display to activate an identifier. Also a text or graphic comment data record of a base graphic representation may be accessed and displayed by a comment data record database review related to a base graphic representation.

These and other features, aspects and advantages of the present invention will become better understood with reference to the following drawings, description and claims.

BRIEF DESCRIPTION OF THE DRAWINGS

FIG. 1 illustrates a functional block diagram of a computer system according to an embodiment of the invention;

FIG. 2 illustrates a flow diagram of a plan review method according to an embodiment of the invention.

DETAILED DESCRIPTION

The following detailed description represents the best currently contemplated modes for carrying out the invention. The description is not to be taken in a limiting sense, but is made merely for the purpose of illustrating the general principles of the invention.

Referring to FIGS. 1 and 2, a method for dynamic linking or connecting between graphic documents and comment databases using a computer system 100 with program may involve storing and selective retrieval of base graphic representations 10 that may be drawings of a project, for example, a building structure, a civil or public works project, construction of a product, and the like that may require monitoring, modification and approval during implementation. The base graphic representation 10 may be derived from converting a user supplied format graphic 12 to a web support format graphic 14, for example, converting pdf, dwf and the like vector systems or tiff, bmp and the like raster systems to swf, jpg and the like systems for Flash or like program native file capability. Descriptive or contractual text material may also be entered in the computer system 100 after conversion to a desired format.

A coordinate overlay grid 16 of a coordinate overlay program 18 may be linked to the base graphic representation 10. The coordinate overlay program 18 may have a linked data storage structure 20 or data base for overlay grid 16 position coordination and display of text records, graphics, identifiers, markup records and the like on the base graphic representation 10. The coordinate overlay program 18 may have a notation subprogram 22 linked or mapped to the coordinate overlay grid 16 to allow a user to identify a coordinate position on the coordinate overlay grid 16 with an assigned symbol or flag and identification text, such as a number code, to serve as an identifier 24 to a location for comment data records 26.

A text or graphic comment data record 26 may be entered in the data storage structure 20. The comment data records 26 may be referenced to various appropriate identifiers 24. A text or graphic comment data record 26 may then be accessed and displayed by positioning a cursor on a desired coordinate position on the base graphic representation 10 with an identifier 24 located by the coordinate overlay grid 16. The accessing and displaying may be done by using a computer mouse 50 or other cursor control device for controlling a display cursor on a display 52 of a user computer 54.

The base graphic representation 10 that may be a web support format graphic 14 form may be stored in a base graphic database DG5. Related created graphic, text and attributes information may be stored in a base graphic thumbnail image file database DG6 and a base graphic information database DG7 for user defined standard information such as name, number, date created version and the like. There may also be a user information database D11, project information database D12 and a client information database D13 having basic project information.

The user supplied format graphic 12 may be stored in a base graphic database native format file DG3 and a base graphic thumbnail image file database native format DG4.

The identifier 24 data may be stored in a symbol library database DG1 for predetermined symbols in various colors and/or shapes. The text or graphic comment data records 26 may be stored in an attached file database DC1 for repository for text or graphic files appended to individual comment records and in a markup snapshot database DG2 for repository for partial view graphic files or snapshots of user defined portions of the basic graphic representation 10.

Several databases may be controlled by the coordinate overlay program 18 for use in comments and markup such as procedural checklist database D14 for quality of review process knowledge base, standard comments database D15 for a review efficiency and uniformity knowledge base and reference material database D16 for a code and design standards knowledge base. There may also be a standard template database D17 for import of standard forms for receiving snapshots for development of supplemental documents.

The system 100 software may have a database query program module P10 to selectively search and access the various databases and to return database records pertinent to specific project activities. The system 100 software may have a third party software link program module for dynamic user interface to third party software, such as, pdf manipulation software, for example, ADOBE ACROBAT. There may be a graphic file access program module P11 to control storage and retrieval of graphic files from respective databases.

The system 100 software may also have a web conference program module P2 for interface to project defined users with the interface automated for access, a web whiteboard program module P3 for common viewing and markup of graphic files, and a notification program module P4 for automatic email notification to project specific users of hierarchy defined comment updates. There may also be a user remote identification module W1 for electronic capture of server and user computer used for access on the Internet.

There may be a thumbnail graphic image program module P5 associated with the user supplied format graphic 12 and base graphic representation 10 for control of the DG4 and DG6 databases. A graphic file conversion program module P8 may convert user supplied format graphic 12 to web support format graphic 14 and for reconversion.

The system 100 software may have a document comparison program module P6 for identification of differences between two graphic files and a file management program P7 for control of storage and retrieval of text, graphic files and stand alone program files relative to and attached to comment records. The system 100 software may also have peripheral support program modules for example, a printing program module P9. Printing subprograms and tools may allow individual or batch printing of database reports, graphic representations, base graphic representation with related identifiers and graphic overlays, review records attached and related files, documents and related graphics, and program administrative reports. Printing may be to standard electronic file formats directed to user printing hardware.

A graphic overlay representation 30 may be controlled by the coordinate overlay program 18 to be positioned intermediate the base graphic representation 10 and the coordinate overlay grid 16 on a display 52 or other device. The graphic overlay representation 30 may serve as an overlay graphic representation positioned on the base graphic representation 10 for recording markup graphics and text relative to the base graphic representation 10. Multiple graphic overlay representation on one or more base graphic representations may be linked to a single comment record. Multiple graphic overlay representations 30 may be used in a multilayer configuration. A drawing tools program module P1 may be used to control markup tools for the graphic overlay.

In use, the method and system may allow defining a graphic boundary box in the graphic overlay representation 30 that may enclose a portion of the base graphic representation 10. Graphic notes may then be entered that may be related to the base graphic representation and indexed by the coordinate overlay grid 16 by an identifier 24. Abbreviated text or graphic records may also be entered in the coordinate overlay program 18 linked data storage 20 for display on the coordinate overlay program 18 linked data storage 20 for display on the coordinate overlay grid 16. Text and/or graphic comment data records 26 may be communicated for display in a worldwide web format document for user comment data correction, for user comment additions or deletions, and for user approval or completion annotation. Review comment entry, database query and other program functions may be utilized independent of graphic interlinks.

While the invention has been particularly shown and described with respect to the illustrated embodiments thereof, it will be understood by those skilled in the art that the foregoing and other changes in form and details may be made therein without departing from the spirit and scope of the invention.

We claim:

1. A method for dynamic linking between graphic documents and comment data bases comprising:
   a) recording a base graphic representation of a project in a computer system including converting a user supplied format graphic to a web support format graphic;
   b) linking a coordinate overlay grid of a coordinate overlay program having a linked data storage structure for overlay position coordination and display on said base graphic representation;
   c) wherein said coordinate overlay program has a notation subprogram linked or mapped to said coordinate overlay grid enabling a user to identify a coordinate position on said coordinate overlay grid with an assigned symbol and identifier;
   d) recording at least a text comment data record in said linked data storage structure referenced to said identifier;
   e) accessing and providing for display a user provided text comment data record by activating said linked data storage structure for a desired coordinate position found by detecting the movement of a cursor over said base graphic representation on a display by the user to a location having a symbol and identifier;
   (f) providing, via a Web whiteboard module, a user interface to a plurality of users for display via respective browsers of the plurality of users via which the plurality of users can collaborate, view, and markup the base graphic representation together in real-time; and
   (g) entering a graphic overlay representation as an overlay graphic registered to said base graphic representation intermediate said base graphic representation and said coordinate overlay grid,
   wherein said graphic comment data record includes defining a graphic boundary box in said graphic overlay representation coordinate overlay enclosing a portion of said base graphic representation including a part or piece of a structure, for graphic notes related to said base graphic representation at said coordinate position.

2. The method as in claim 1, wherein providing for display in (e) includes display of an abbreviated text record on said coordinate overlay grid.

3. The method as in claim 1, wherein providing for display in (e) includes converting graphic and text comment data records to a user designated format for export of said comment data to users.

4. The method as in claim 1, further comprising:
   providing for display said text comment data record in a web page text format document for user comment data correction, for user comment additions or deletions, and for user approval or completion annotation.

5. The method as in claim 1, further comprising:
   providing for display said graphic comment data record in a web page graphic format document for user comment graphic correction, for user comment additions or deletions, and for user approval or completion annotation.

6. The method as in claim 1, wherein the plurality of users can collaborate using only a Web browser, the method further comprising:

storing partial view graphic files or snapshots of user defined portions of the basic graphic representation in a first database;

storing the web support format graphic in a base graphic database, and storing related created graphic, text and attributes information in a base graphic thumbnail image file database.

7. The method as in claim 1, wherein the plurality of users can collaborate using only a Web browser.

8. The method as in claim 1, the method further comprising communicating, for display, text and/or graphic comment data records in a web format document to receive:

comment data correction, comment additions, comment deletions, approval, and completion annotation.

9. The method as in claim 1, the method further comprising linking a first comment record to a plurality of graphic overlay representations.

10. The method as in claim 1, the method further comprising providing a multilayer configuration which enables the use of a plurality of graphic overlay representations.

11. The method as in claim 1, the method further comprising storing the text comment data record in an attached file database.

12. The method as in claim 1, the method further comprising providing a database for import of forms for receiving snapshots for development of supplemental documents.

13. The method as in claim 1, wherein converting the user supplied format graphic to the web support format graphic further comprises converting pdf, tiff, or bmp to the web support format graphic.

14. The method as in claim 1, the method further comprising providing a query program configured to selectively search and access a plurality of databases and to return database records pertinent to specific project activities.

15. The method as in claim 1, the method further comprising converting the web support format graphic to the format of the user supplied format graphic.

16. A system for dynamic linking between graphic documents and comment data bases comprising:

a computing device;

memory that stores a program that when executed by the computing device causes the computing device to perform operations comprising:

a) converting a user supplied format graphic to a web support format graphic to a base graphic representation of a project;

b) linking a coordinate overlay grid of a coordinate overlay program having a linked data storage structure for overlay position coordination and display on said base graphic representation;

c) wherein said coordinate overlay program has a notation subprogram linked or mapped to said coordinate overlay grid that includes a user interface that enables the identification of a coordinate position on said coordinate overlay grid with an assigned symbol and identifier;

d) recording at least a text comment data record in said linked data storage structure referenced to said identifier;

e) accessing and providing for display the text comment data record by activating said linked data storage structure for a desired coordinate position at least partly in response to a user moving a cursor over a location included in said base graphic representation on a display;

(f) providing, via a Web whiteboard module, a user interface to a plurality of users for display via respective browsers of the plurality of users via which the plurality of users can collaborate, view, and markup the base graphic representation together in real-time; and (g) entering a graphic overlay representation as an overlay graphic registered to said base graphic representation intermediate said base graphic representation and said coordinate overlay grid, wherein said graphic comment data record includes enabling a graphic boundary box to be defined in said graphic overlay representation coordinate overlay enclosing a portion of said base graphic representation for graphic notes related to said base graphic representation at said coordinate position.

17. The system as defined in claim 16, wherein providing for display in (e) includes providing for display an abbreviated text record on said coordinate overlay grid.

18. The system as defined in claim 16, wherein providing for display in (e) includes converting graphic and text comment data records to a user designated format for export of said comment data to users.

19. The system as defined in claim 16, the operations further comprising:

providing for display said text comment data record in a web page text format document for user comment data correction, for user comment additions or deletions, and for user approval or completion annotation.

20. The system as defined in claim 16, the operations further comprising:

providing for display said graphic comment data record in a web page graphic format document for user comment graphic correction, for user comment additions or deletions, and for user approval or completion annotation.

21. The system as defined in claim 16, wherein the plurality of users can collaborate using only a Web browser, the operations further comprising:

storing partial view graphic files or snapshots of user defined portions of the basic graphic representation in a first database;

storing the web support format graphic in a base graphic database, and storing related created graphic, text and attributes information in a base graphic thumbnail image file database.

22. The system as defined in claim 16, wherein the plurality of users can collaborate using only a Web browser.

23. The system as defined in claim 16, the operations further comprising communicating, for display, text and/or graphic comment data records in a web format document to receive:

comment data correction, comment additions, comment deletions, approval, and completion annotation.

24. The system as defined in claim 16, the operations further comprising linking a first comment record to a plurality of graphic overlay representations.

25. The system as defined in claim 16, the operations further Comprising providing a multilayer configuration which enables the use of a plurality of graphic overlay representations.

26. The system as defined in claim 16, the operations further comprising storing the text or graphic comment data record in an attached file database.

27. The system as defined in claim 16, the operations further comprising providing a database for import of forms for receiving snapshots for development of supplemental documents.

28. The system as defined in claim 16, wherein converting the user supplied format graphic to the web support format graphic further comprises converting pdf, or bmp to the web support format graphic.

29. The system as defined in claim 16, the operations further comprising providing a query program configured to selectively search and access a plurality of databases and to return database records pertinent to specific project activities.

30. The system as defined in claim 16, the operations further comprising converting the web support format graphic to the format of the user supplied format graphic.

* * * * *